US009913278B2

(12) United States Patent
Heninwolf et al.

(10) Patent No.: US 9,913,278 B2
(45) Date of Patent: Mar. 6, 2018

(54) SYSTEMS AND METHODS FOR DYNAMICALLY ALLOCATING WIRELESS SERVICE RESOURCES CONSONANT WITH SERVICE DEMAND DENSITY

(71) Applicant: Google Inc., Mountain View, CA (US)

(72) Inventors: Paul Heninwolf, Mountain View, CA (US); Sharath Ananth, Mountain View, CA (US)

(73) Assignee: Google LLC, Mountain View, CA (US)

( * ) Notice: Subject to any disclaimer, the term of this patent is extended or adjusted under 35 U.S.C. 154(b) by 75 days.

(21) Appl. No.: 15/174,472

(22) Filed: Jun. 6, 2016

(65) Prior Publication Data
US 2017/0353960 A1 Dec. 7, 2017

(51) Int. Cl.
H04W 72/12 (2009.01)
H04W 72/04 (2009.01)
H04B 7/06 (2006.01)
H04B 7/04 (2017.01)
H04L 29/08 (2006.01)

(52) U.S. Cl.
CPC .......... H04W 72/0473 (2013.01); H04B 7/04 (2013.01); H04B 7/0617 (2013.01); H04L 67/18 (2013.01); H04W 72/042 (2013.01)

(58) Field of Classification Search
CPC H04W 72/0473; H04W 72/042; H04L 67/18; H04B 7/04; H04B 7/0617
See application file for complete search history.

(56) References Cited

U.S. PATENT DOCUMENTS 5,909,460 A    6/1999  Dent
6,351,499 B1   2/2002  Paulraj et al.
(Continued)

FOREIGN PATENT DOCUMENTS

WO    2001013543 A1    2/2001
WO    WO-02/21726      3/2002
(Continued)

OTHER PUBLICATIONS

International Search Report and Written Opinion dated Mar. 27, 2017 in PCT Application No. PCT/US2016/069219 (13 pages).
(Continued)

Primary Examiner — Wei Zhao
(74) Attorney, Agent, or Firm — McDermott Will & Emery LLP

(57) ABSTRACT

Wireless service is provided to a service area using limited resources dynamically reallocated to maximize capacity in high demand regions. An antenna array transmits a plurality of downlink beams, each covering a respective region of a service area. An antenna management logic identifies a high demand region serviced by downlink beams transmitted from a first set of antennas at a first power level and a low demand region serviced by downlink beams transmitted from a second set of antennas at a second power level. The antenna management logic reconfigures the antenna array to provide the wireless service to the high demand region at a power level higher than the first power level, and to provide the wireless service to the low demand region at a power level lower than the second power level, such that the antenna array does not exceed a maximum power level available from a power supply.

20 Claims, 4 Drawing Sheets

(56) References Cited

U.S. PATENT DOCUMENTS

| | | |
|---|---|---|
| 6,577,878 B1 | 6/2003 | Park et al. |
| 6,891,813 B2 | 5/2005 | Feria et al. |
| 2014/0226574 A1* | 8/2014 | Guo ................ H04W 16/10 370/329 |
| 2015/0257118 A1* | 9/2015 | Siomina .............. G01S 5/021 455/456.1 |
| 2017/0034841 A1* | 2/2017 | Bethanabhotla ...... H04W 28/08 |

FOREIGN PATENT DOCUMENTS

| | | |
|---|---|---|
| WO | WO-2015/094534 | 6/2015 |
| WO | 2016073863 A1 | 5/2016 |

OTHER PUBLICATIONS

Hong, Yang et al. "Optimal Power Allocation for Multiple Beam Satellite Systems" Radio and Wireless Symposium, 2008 IEEE, pp. 823-826, Jan. 22, 2008.

Lähdekorpi, P., et al., Replacing Terrestrial UMTS Coverage by HAP in Disaster Scenarios, IEEE Wireless Conference (EW), Apr. 2010, pp. 14-19.

Letizia, M., Circularly Polarized Multi-Beam Antenna System for High-Altitude-Platforms, Doctoral Dissertation, École Polytechnique Fédérale De Lausanne, 2013.

Mehrotra, R., et al., An Integrated Framework for Optimizing Power Sonsumption of Smart Antennas, IEEE Conference on Communications, Feb. 2014.

Shetty, K., A Novel Algorithm for Uplink Interference Suppression Using Smart Antennas in Mobile Communications, Thesis, Florida State Univ., Apr. 2004.

\* cited by examiner

SYSTEMS AND METHODS FOR DYNAMICALLY ALLOCATING WIRELESS SERVICE RESOURCES CONSONANT WITH SERVICE DEMAND DENSITY

BACKGROUND

Mobile communication equipment, e.g., cellular telephones, mobile modems, and the like, provide communication services to end-users by interacting with a communication network via a radio link to a network access node. Depending on the protocol or standard used for the radio link, the mobile communication equipment may be referred to as a mobile device, mobile terminal, mobile station, or as user equipment ("UE"). For example, the standards for Global System for Mobile Communications ("GSM") usually refer to the mobile communication equipment as the "mobile station," whereas the standards for Universal Mobile Telecommunication System ("UMTS") usually refer to the mobile communication equipment as the "user equipment." This disclosure uses the term "user equipment" (or "UE" for short) to refer to all forms of mobile communication equipment, including devices traditionally referred to by the term "user equipment," as well as mobile communication equipment traditionally referred to by other terms.

Generally, a communication network will service an area divided into multiple regions or "cells," each serviced by distinct antennas and base stations. As a UE moves through the service area, it may travel from one cell to another and thus need to be serviced by different base stations. If the UEs in a service area are spread out relatively evenly, the load on the base stations will also be spread relatively evenly. However, in practice, UEs tend to present within a service area in uneven clusters or "lumps," with a large number of UEs in use near some base stations and fewer UEs in use near other base stations. These lumps generally move over the course of a day, requiring portions of the network to be provisioned to handle the large potential number of UEs even when not present. As a result, this "lumpiness" requires carriers to provision terrestrial base stations to accommodate the maximum expected utilization at all times, even when utilization is low. However, this only works where the necessary resources are readily available.

SUMMARY

In some aspects, the disclosure relates to a system for providing a wireless service to a service area using limited resources dynamically reallocated to maximize capacity in high demand regions. The system includes an antenna array configured to provide the wireless service to the service area by transmitting a plurality of downlink beams, each downlink beam covering a respective service region of the service area. The system includes a power supply configured to power the antenna array up to a maximum power level. And the system includes an antenna management logic. The management logic is configured to execute instructions that, when executed, cause the antenna management logic to identify a high demand region of the service area made up of service regions serviced by downlink beams transmitted from a first set of antennas at a first power level and identify a low demand region of the service area made up of service regions serviced by downlink beams transmitted from a second set of antennas at a second power level. The management logic is further configured to execute instructions that, when executed, cause the antenna management logic to reconfigure the antenna array to provide the wireless service to the high demand region of the service area at a third power level higher than the first power level, and provide the wireless service to the low demand region of the service area at a fourth power level lower than the second power level, such that the antenna array has a total power requirement that does not exceed the maximum power level available from the power supply.

In some aspects, the disclosure relates to a method that includes providing a wireless service to a service area by transmitting, via an antenna array, a plurality of downlink beams, each downlink beam covering a respective service region of the service area, and powering the antenna array from a power supply up to a maximum power level. The method includes identifying, by an antenna management logic, a high demand region of the service area serviced by downlink beams transmitted from a first set of antennas at a first power level, and identifying, by the antenna management logic, a low demand region of the service area serviced by downlink beams transmitted from a second set of antennas at a second power level. The method includes reconfiguring the antenna array to provide the wireless service to the high demand region of the service area at a third power level higher than the first power level, and provide the wireless service to the low demand region of the service area at a fourth power level lower than the second power level, such that the antenna array has a total power requirement that does not exceed the maximum power level available from the power supply.

In some aspects, the disclosure relates to a computer-readable memory storing executable instructions that, when executed by a computing processor, cause the computing processor to identify a high demand region and a low demand region of a service area for a wireless service provided by downlink beams transmitted from an antenna array powered by a power supply up to a maximum power level, each downlink beam covering a respective service region of the service area, the high demand region of the service area serviced by downlink beams transmitted from a first set of antennas at a first power level, and the low demand region of the service area serviced by downlink beams transmitted from a second set of antennas at a second power level. The instructions, when executed by the computing processor, cause the computing processor to reconfigure the antenna array to provide the wireless service to the high demand region of the service area at a third power level higher than the first power level, and provide the wireless service to the low demand region of the service area at a fourth power level lower than the second power level, such that the antenna array has a total power requirement that does not exceed the maximum power level available from the power supply.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements.

DETAILED DESCRIPTION

Figure 1:
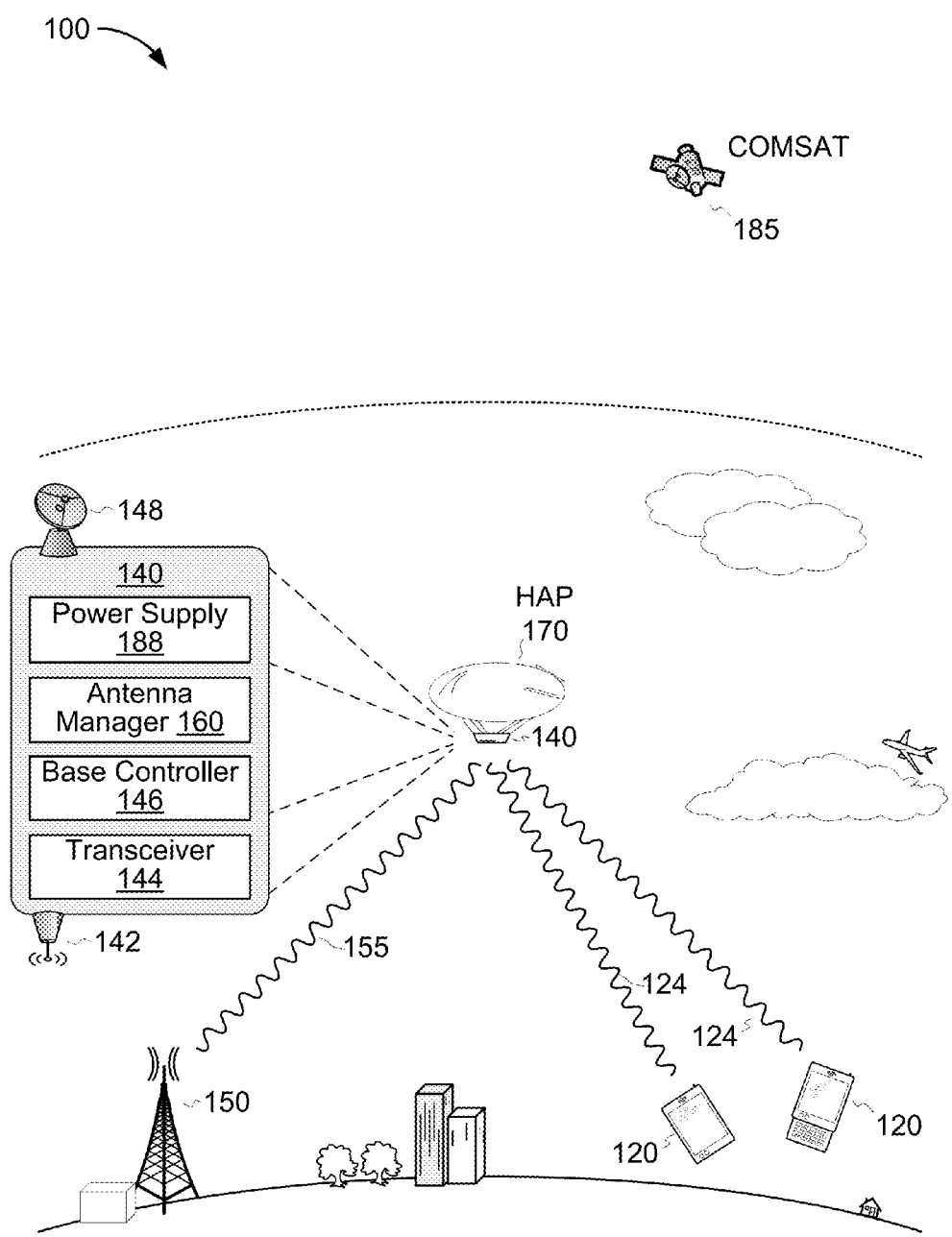
FIG. 1 is a diagram of an example mobile communication environment.

FIG. 1 is a diagram of an example mobile communication environment 100. In broad overview, FIG. 1 depicts example user equipment 120 ("UE") in communication with a network access node in the form of a base station 140 aboard a high altitude platform 170 ("HAP"). The discrete elements of a network access node may include, for example, various antenna structures, radio transceivers ("TRX"), one or more base transceiver stations ("BTS," also called a "Node B," "Evolved Node B," or "eNodeB," depending on the implemented protocol or standard), amplifiers, controllers, and so forth. The illustrated base station 140 is an example of such a network access node, but is not a limitation on the types of access nodes that can be used. FIG. 1 includes an expanded illustration of the base station 140, depicting a radio antenna 142, transceiver 144, base controller 146, satellite antenna 148, antenna manager 160, and power supply 188. The radio antenna 142 is one of several antennas in an antenna array controlled by the antenna manager 160. The user equipment 120 interacts with the base station 140 via radio communications 124 received or transmitted by the antennas in the array, e.g., the radio antenna 142. In some implementations, the network access node connects the UE to a broader communication network. In some implementations, the network access node is in communication with a ground station 150 via radio communications 155. In some implementations, the network access node is in communication with a communication satellite 185, via the satellite antenna 148. Although depicted within the base station 140 aboard the HAP 170, the antenna manager 160 can alternatively be located remotely from the base station 140, or even remotely from the HAP 170, e.g., at the ground station 150. For example, in some implementations, the antenna manager 160 is located in a ground-based data center or flight control center and controls the antenna array aboard the HAP 170 via one or more wireless data links.

Referring to FIG. 1 in more detail, the example mobile communication environment 100 supports wireless communication with mobile user equipment 120 ("UE"). The UE 120 is a mobile communication device such as a cellular telephone, tablet computing device, mobile modem, laptop or notebook computing device, or any other wireless communication device. The UE 120 includes a user interface (e.g., a keypad or touchscreen), a power supply (e.g., a battery), memory, one or more processors (e.g., an application-specific mobile device processor), a radio transceiver, and an antenna or antenna array. In some implementations, the UE 120 includes a microphone and a speaker. In some implementations, the UE 120 includes a Subscriber Identification Module ("SIM") uniquely identifying the UE 120 within the communication environment 100.

The UE 120 interacts with a communication network via a radio link between the UE and a network access node using any wireless communication protocol, such as the Global System for Mobile Communications ("GSM"), Enhanced Data rates for GSM Evolution ("EDGE"), Universal Mobile Telecommunication System ("UMTS"), Code Division Multiple Access ("CDMA"), Time Division Synchronous Code Division Multiple Access ("TD-SCDMA"), High Speed Packet Access ("HSPA"), Long-Term Evolution ("LTE"), LTE Advanced, Long-Term Evolution Time-Division Duplex ("LTE-TDD"), or any other such protocol including, but not limited to, so-called "3G," "4G," and "5G" protocols. The UE 120 may interact with a terrestrial network access node, e.g., the ground station 150, or with an airborne network access node, e.g., the base station 140 aboard the HAP 170. The UE 120 is any mobile communication device capable of interacting with a network access node to provide communication services such as voice communication, message delivery, and/or packetized data exchange, using any of the aforementioned wireless communication protocols. In some instances, the UE 120 is operated out-of-range of ground-based communication base stations (e.g., ground station 150) and, instead, uses the communication services provided by the airborne base station 140.

The radio link between the UE 120 and a base station 140 at the network access node includes one or more downlinks for transmissions from the base station 140 to the UE 120 and one or more uplinks for transmissions from the UE 120 to the base station 140. In broad overview, the base station 140 transmits a downlink from an antenna 142 to a region of a service area. The UE 120, when present in that region, can detect the downlink and attempt to establish a link with the base station 140 based on the detected downlink. The various wireless communication protocols distinguish between multiple UEs in a region by assigning downlink time slots, frequency ranges, identifiers, or other distinguishing characteristics for each UE. In some implementations, a beam is divided into multiple channels, where each channel is used by one or more UEs, e.g., using a shared channel access method such as Time Division Multiple Access (TDMA) or Code Division Multiple Access (CDMA). Each beam uses a range of radio frequency (RF) spectrum. The wider the range of spectrum used, the more channels (and therefore the higher demand) the beam can support. In some implementations, a communication protocol may have a maximum number of UEs that can be supported by each channel in a downlink beam under optimal conditions. This maximum number may be lower when conditions are sub-optimal. While this discussion focuses primarily on downlink beams, the concepts apply equally to uplink beams.

The network access node may be stationary, e.g., using a terrestrial tower or other ground-based structure, or the network access node may be mobile. In some implementations, the network access node is mounted to an airborne platform referred to herein as a high altitude platform ("HAP").

The high altitude platform 170 ("HAP") provides an airborne platform for a network access node including the base station 140. In some implementations, the HAP 170 is an aerostat such as a zeppelin, dirigible, or hot air balloon. In some implementations, the HAP 170 is a fixed-wing airplane. In some implementations, the HAP 170 is a rotorcraft such as a helicopter. In some implementations, the HAP 170 is an unmanned aircraft such as a multi-copter drone. The communication equipment aboard the HAP draws power from an on-board power supply 188, e.g., a battery, that can only supply up to a fixed maximum power level. Accordingly, unlike terrestrial towers, the power resources available to the network access node aboard the HAP 170 are more limited.

The network access node aboard the HAP 170, which includes the base station 140, provides wireless services to a service area that can be divided into multiple regions. Each region covers a portion of the service area. User equipment (UE) 120 within a given region, serviced by the network access node aboard the HAP 170, represents a utilization demand on the network access node. The UE 120 present within the service area tend not to be evenly distributed through the service area; this is referred to as demand "lumpiness." As a result, some regions of the service area may have a higher demand, or a lower demand, than other regions of the service area. Some regions may be classified as a "high" or "low" demand regions based on differences in utilization demand within the different regions. In general, a high demand region is one in which the demand, e.g., the number of UE 120, is greater than in the rest of the service area and a low demand region is one in which the demand, e.g., the number of UE 120, is less than in the rest of the service area. In some implementations, one or more threshold factors are used to differentiate between a middle level of demand and the high or low demand levels. For example, in some implementations, the regions are ranked by utilization demand and the regions with the most demand are the high demand regions whereas the regions with the least demand are the low demand regions. In some implementations, the top n regions are high demand regions, and the lowest m regions are low demand regions. In some implementations, an average demand is identified and regions with demand higher than the average demand by at least a first threshold are deemed high demand regions. For example, in some implementations, the first threshold is a percentage, e.g., a region is a high demand region if demand in that region is at least 10% above the average, 25% above the average, 50% above the average, 75% above the average, 100% above the average, or any other suitable threshold percentage. Likewise, in such implementations, regions with demand lower than the average demand by at least a second threshold are deemed low demand regions. In some implementations, the second threshold is a percentage, e.g., a region is a low demand region if demand in that region is at least 10% below the average, 25% below the average, 50% below the average, 75% below the average, or any other suitable threshold percentage. In some implementations, a region is a high demand region if it services more than a threshold fraction of overall demand. For example, in some implementations, any region servicing more than x/n UE 120 is a high demand region, where x is a configurable number (e.g., 2) and n is the number of regions. For example, if there are 19 regions such that each region might be expected to have 1/19 of the demand, then if a region has a larger fraction of the demand, e.g., 2/19 of the demand if x=2, then it is a high demand region. Likewise, in some implementations, any region servicing less than y/n UE 120 is a low demand region, where y is a configurable number (e.g., 0.5) and n is the number of regions. In some implementations, the values for x and y are configurable. In some implementations, regions are dynamically treated as high or low demand regions in accordance with a sliding scale.

In some implementations, the HAP 170 maintains a flight pattern that keeps the network access note in a relatively fixed location. This flight pattern is a form of holding pattern referred to as "station keeping." In some implementations, the HAP 170 does not sustain a precisely fixed location and instead travels a route that keeps it within service range of a supported area, e.g., by flying circles, ovals, figure eights, or other such holding patterns. As the HAP 170 moves along its route, it passes through different aerial positions over time. In some implementations, the HAP 170 uses station keeping or other flight patterns to keep specific terrestrial service areas within range. As needed, the location of the HAP 170 may be adjusted, e.g., to orient (or re-orient) the antenna array in relation to the terrestrial service areas. For example, in some implementations, specific antennas in the antenna array are designated to support high demand regions within the service area and the HAP 170 travels a flight path to keep these designated antennas directed towards the high demand regions. If demand moves, the flight path is adjusted accordingly. In some implementations, the HAP 170 is controlled remotely, e.g., from a remote flight control center. In some such implementations, the HAP 170 receives control instructions from the remote flight control center via satellite communications or network links.

The network access node aboard the high altitude platform 170 includes at least one base station 140. FIG. 1 includes an expanded illustration of the base station 140, depicting a radio antenna 142, transceiver 144, base controller 146, satellite antenna 148, power supply 188, and antenna manager 160. Although illustrated as a unified structure, the elements of the base station 140 may be implemented as discrete systems installed on the HAP 170. In some implementations, the HAP 170 will carry multiple instances of some or all elements of the base station 140. For example, the HAP 170 carries multiple antennas 142 in an antenna array. In some implementations, the positioner 160 is aboard the HAP 170, as shown. In some implementations, the antenna manager 160 is located in a ground-based data center and controls the antenna array via one or more wireless data links. In some implementations, the HAP 170 is controlled from a remote flight control center. In some such implementations, the antenna manager 160 is located at the remote flight control center.

Figure 2A:
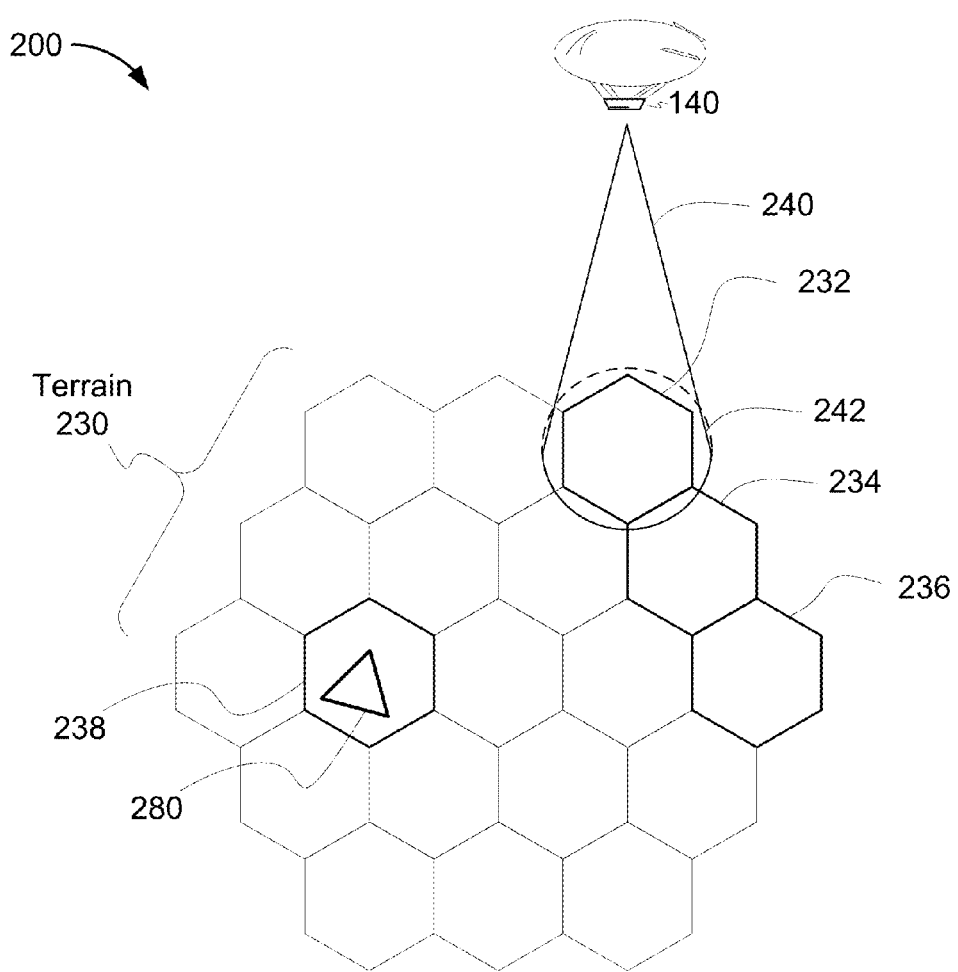
FIG. 2A is a diagram illustrating terrain serviced by a high altitude platform.

The base station 140 is part of a network access node that includes multiple antennas 142. Each antenna 142 is configured to send radio signals to, and/or receive radio signals from, other radio-based devices, e.g., user equipment 120. In some implementations, each antenna 142 is structured in a manner to conform with a specific radio transmission protocol or standard. In some implementations, at least one antenna 142 is omnidirectional. In some implementations, at least one antenna 142 is directed. A directional antenna broadcasts signals in, or receives signals from, a particular direction and covers a slice of space that is less than 360° around the antenna. When the HAP is airborne, an antenna 142 on the HAP 170 is directed downwards, towards the ground, such that the broadcast beam from the downward facing antenna 142 forms a conical shape, with the ground intersecting the beam and forming the base of the cone. The downlink beam transmitted by the antenna 142 may be received (at various strengths) anywhere within the cone. This is illustrated in FIG. 2A, described below. The shape and direction of the beam can be controlled in several ways, including by moving the HAP 170 (thereby moving the antenna 142), or by moving the antenna relative to the HAP 170, e.g., using a gimbaled mount, or by beam forming (analog or digital). In some implementations, the antenna manager 160 controls one or more antennas 142 in the antenna array by actuating one or more servo motors to move or gimbal the antenna 142 relative to the HAP 170. In some implementations, the antenna manager 160 controls one or more antennas 142 in the antenna array by adjusting parameters used in beam forming. In some implementations, the array of antennas aboard the HAP 170 is divided into subsets, including a subset of antennas that are stationary relative to the HAP 170 and a subset of antennas that are attached by an articulated mount or gimbals such that they may be reoriented relative to the HAP 170, e.g., by actuation of one or more servo motors.

The base station 140 includes one or more transceivers 144 for converting signals between the antennas 142 and the base controller 146. The transceiver 144 includes receiver circuitry for converting a signal from a radio frequency alternating current received at an antenna 142 and transmitter circuitry for converting a signal to a radio frequency alternating current, which is applied to an antenna 142 for transmission. In some implementations, the transceiver 144 includes an amplifier. In some implementations, a transceiver 144 includes only receiver circuitry (making it a receiver). In some implementations, a transceiver 144 includes only transmission circuitry (making it a transmitter). In some implementations, a transceiver includes combined receiver and transmission circuitry (making it a proper transceiver). In some implementations, the base station 140 includes one transceiver 144 for each antenna 142. In some implementations, the base station 140 includes one transceiver 144 for use with multiple antenna 142.

The base station 140 includes one or more base controllers 146. The base controller 146 includes circuitry, memory, and computing processors for connecting communication transmissions between user equipment 120 and a communication network (not shown). In some implementations, the communication network is a telephony network. In some implementations, the communication network is a data network such as the Internet. In some implementations, the base station 140 is in communication with a ground station 150 that provides a connection to the communication network. In some implementations, the base station 140 is in communication with a communication satellite 185 that provides a connection to the communication network. In some implementations, the base controller 146 is implemented using a general purpose processor. In some implementations, the base controller 146 is implemented using special purpose logic circuitry, e.g., an application specific integrated circuit ("ASIC").

The base station 140 includes one or more satellite antennas 148 for interacting with satellites. In some implementations, the base station 140 is in communication with a communication satellite 185 for access to a communication network and the base station 140 uses a satellite antennas 148, e.g., for interacting with the communication satellite 185. In some implementations, the base station 140 receives satellite-based positioning data, e.g., from Global Navigation Satellite System ("GNSS") satellites, via the satellite antennas 148. GNSS satellites broadcast signals that are used by a receiver to position the receiver. Examples of global navigation satellite systems include the United States' Global Positioning System ("GPS") satellites, Russia's GLObal NAvigation Satellite System ("GLONASS") satellites, and Europe's Galileo satellites. A device (e.g., a GPS receiver) receiving signals broadcast by these types of global navigation satellites uses the signals to determine a location of the device (i.e., to position the device.)

The base station 140 includes a power supply 188. The HAP 170 is an airborne platform, disconnected from the electrical grid. Everything aboard the HAP 170 that requires electrical power draws electricity from generators and/or batteries. Together, these generators and batteries form the power supply 188. Generators produce electricity for immediate use or for charging the batteries for deferred use. In some implementations, the generator is an auxiliary power unit separate from the propulsion system for the HAP 170. In some implementations, the power supply 188 includes a combustion-based generator, e.g., using a diesel or gas powered engine. In some implementations, the power supply 188 includes photovoltaic cells (solar cells). In some implementations, the power supply 188 includes a fuel cell. The power supply 188 is configured to power the antenna array up to a maximum power level, e.g., up to about 120 watts.

Still referring to FIG. 1, the illustrated example base station 140 includes an antenna manager 160. In some implementations, the antenna manager 160 is co-located with the base station 140 aboard the HAP 170. In some implementations, the antenna manager 160 is not aboard the HAP 170. The antenna manager 160 is a system for controlling the antennas 142 in the antenna array.

Figure 2B:
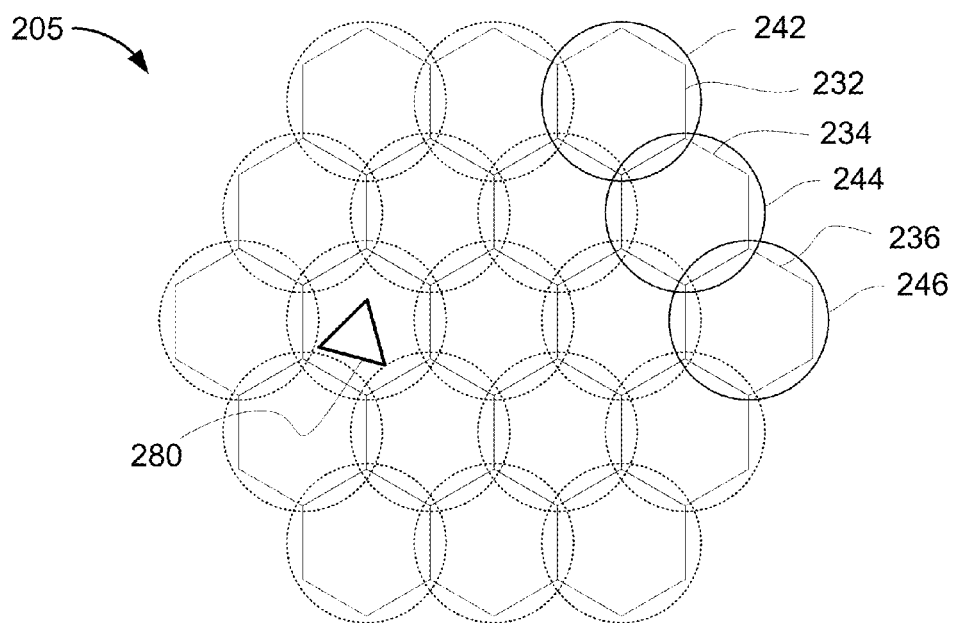
FIG. 2B is a diagram illustrating evenly distributed service coverage of the terrain.
Figure 2C:
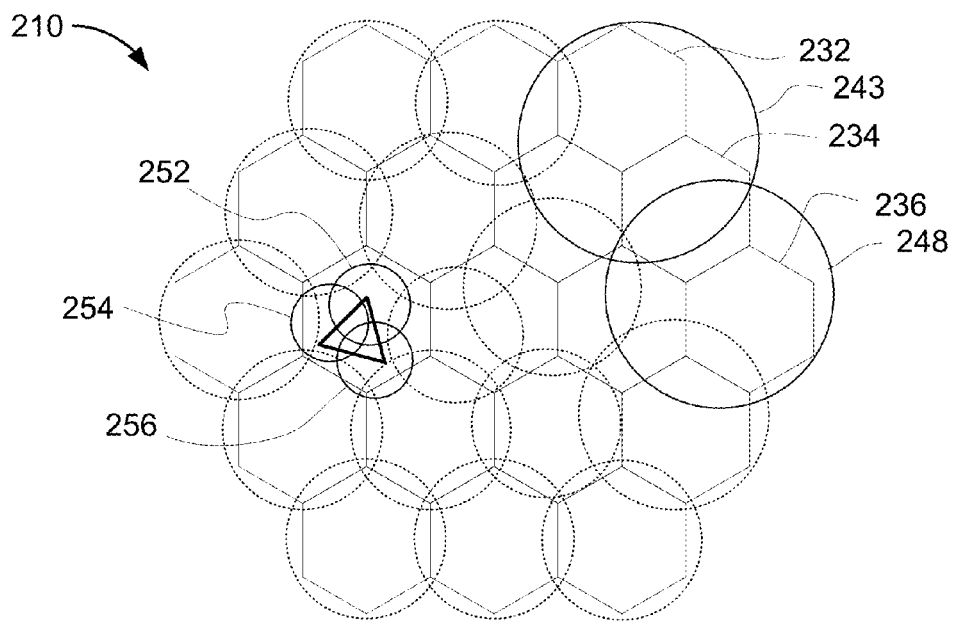
FIG. 2C is a diagram illustrating demand-oriented service coverage of the terrain.

The antenna manager 160 dynamically configures, and reconfigures, the antennas 142 in the antenna array to provide different service levels to different regions within the coverage area serviced from the HAP 170. The antenna manager 160 configures the antennas 142 to provide increased coverage of areas with high utilization. The user equipment 120 present within the service area tend not to be evenly distributed through the service area (referred to as demand "lumpiness"). Additionally, demand density tends to move within the service area over time, e.g., with different demand distributions on work days versus holidays and even different demand distributions over the course of a day. Consider, for example, the expected difference in usage patterns for heavily residential areas as compared to expected usage patterns for heavily industrial or business-occupied areas. Customer movement within a geographic area is a known issue, and typical terrestrial solutions are to over-provision fixed-location base stations to provide coverage sufficient for peak-utilization in each geographic area at all times. However, the HAP 170 has limited resources, e.g., finite available electrical power from the power supply 188, and thus such over-provisioning is not necessarily feasible or desirable. Instead, the mobile base station allocates resources to provide higher capacity where utilization is higher and lower capacity where utilization is lower, and reallocates resources as demand shifts. FIGS. 2A, 2B, and 2C illustrate this reallocation.

FIG. 2A is a diagram illustrating a terrain 230 serviced by a high altitude platform 170. FIG. 2B is a diagram illustrating evenly distributed service coverage of the terrain 230. FIG. 2C is a diagram illustrating demand-oriented service coverage of the terrain 230.

FIG. 2A, in broad overview, shows a scene 200 with a terrain 230 illustrated as a field of nineteen hexagons including, as examples, regions 232, 234, 236, and 238. Region 238 is illustrated as a hexagon around a triangle 280, which represents a high demand area discussed in more detail below. The airborne base station 140 provides wireless communication services to a service area, e.g., the terrain 230, by projecting downlink beams over various regions in the service area, e.g., by projecting a downlink beam 240 over the region 232 as shown. The downlink beam 240 forms a coverage circle 242 over the region 232. A UE 120 within the region 232 is within the coverage circle 242 and can use the downlink beam 240 to establish a radio link with the base station 140.

Each downlink beam, e.g., downlink beam 240, requires allocation of a certain amount of resources aboard the HAP 170. For example, the downlink beam 240 requires use of an antenna 142, a transceiver 144, and energy from the power supply 188. The amount of energy needed to power the antenna 142 to transmit the downlink beam 240 is a function of several factors that account for the frequency range transmitted, the antenna aperture corresponding to the width of the downlink beam 240, the distance from the HAP 170 to the serviced ground region 232, the desired signal strength at the receiving end, the desired size of the coverage circle 242 (which is a function of the antenna aperture or beam width), and various transient environmental variables. In general, transmission of a narrower frequency range requires less power than transmission of a broader frequency range. Likewise, a narrow beam producing a small coverage circle requires less power than a wider beam producing a larger coverage circle at the same signal strength. However, for some antennas, the power expended in constraining a beam to the narrower area can exceed the power that can be saved by taking advantage of the increased gain over the smaller area. In either case, constraining the size of a beam to a smaller coverage circle allows more adjacent beams to be directed to a given high demand region without spatially overlapping and interfering with one another. Increasing the beam width while increasing the power allocation to maintain the desired signal strength still carries protocol-dependent limitations on the number of UEs 120 that any one beam can support.

Accordingly, when wider beams are used to cover an area, fewer beams may be needed to cover that area; however, by using fewer beams, the aggregate capacity provided to that area is reduced. For example, suppose each beam supports n devices such that an area covered by three beams has a capacity of 3n devices. If the three beams are replaced by two wider beams, in this example, the capacity drops to 2n devices. However, if the utilization in the area is less than 2n, the coverage is still adequate. In some implementations, the frequency range of a beam may be widened to use a broader slice of the RF spectrum. This allows for more communication channels to be handled by the beam, at the cost of a higher energy requirement for the increased frequency range. Accordingly, the frequency range of a downlink beam can be increased to increase capacity and handle increased demand at the cost of increased power consumption, and the frequency range of a downlink beam can narrowed to reduce power consumption in response to a determination that less capacity is needed due to a decrease in demand. By balancing the coverage width, gain, and frequency range of each beam, the capacity and power consumption associated with each beam can be adjusted to various demand distributions.

In some instances, a single beam is provided by multiple collaborative antennas. Adjacent beams, e.g., servicing adjacent regions, use non-overlapping frequency ranges and/or distinct channel identifiers (e.g., a CDMA modulation code) such that a UE with visibility to multiple beams can distinguish between them. Non-adjacent beams may re-use frequencies or channel identifiers.

FIG. 2B, in broad overview, shows a scene 205 with service evenly distributed over the terrain 230. Each hexagonal region, e.g., regions 232, 234, and 236, is shown encircled by a coverage circle, e.g., circles 242, 244, 246, each corresponding to a respective downlink beam transmitted by a respective antenna. That is, to provide evenly distributed service to the nineteen regions of the terrain 230, nineteen antennas are allocated to each provide a corresponding downlink beam. If, for example, the power supply 188 is limited to 120 watts, each of the nineteen beams is allocated approximately 6.3 watts.

However, the user equipment 120 within a service area tend not to be evenly distributed through the service area. Instead, in practice, UEs tend to present within a service area in uneven lumps, with a large number of UEs in use in some areas and fewer UEs in use in other areas (referred to as demand "lumpiness"). These lumps also generally move over time, depending on the day or hour. Accordingly, it might not be necessary or appropriate to allocate the same resources to low demand regions, e.g., the regions 232, 235, and 236, as to high demand regions, e.g., illustrated in FIGS. 2A, 2B, and 2C as the triangle 280 in region 238.

FIG. 2C, in broad overview, shows a scene 210 with demand-oriented service coverage of the terrain 230. In FIG. 2C, the regions 232, 234, and 236 are shown encircled by two wide-coverage circles 243 and 248. These wide-coverage circles 243 and 248 cover at least the same terrain covered in FIG. 2B by the coverage circles 242, 244, and 246. Beam direction and width can be controlled by beam forming (analog or digital) or by physically altering and moving an antenna, e.g., using a gimbal. In some implementations, the HAP 170 moves to help orient the beams. By using wider coverage circles, such as wide-coverage circles 243 and 248, fewer resources are needed to cover the same terrain 230. This frees up resources to provide enhanced service coverage where demand is highest, e.g., the triangle 280. Both scene 205 in FIG. 2B and scene 210 in FIG. 2C show nineteen hexagonal terrain regions and nineteen coverage circles; however, the scene 210 shown in FIG. 2C concentrates three of the coverage circles 252, 254, and 256 over the triangle 280, where demand is highest.

Figure 3:
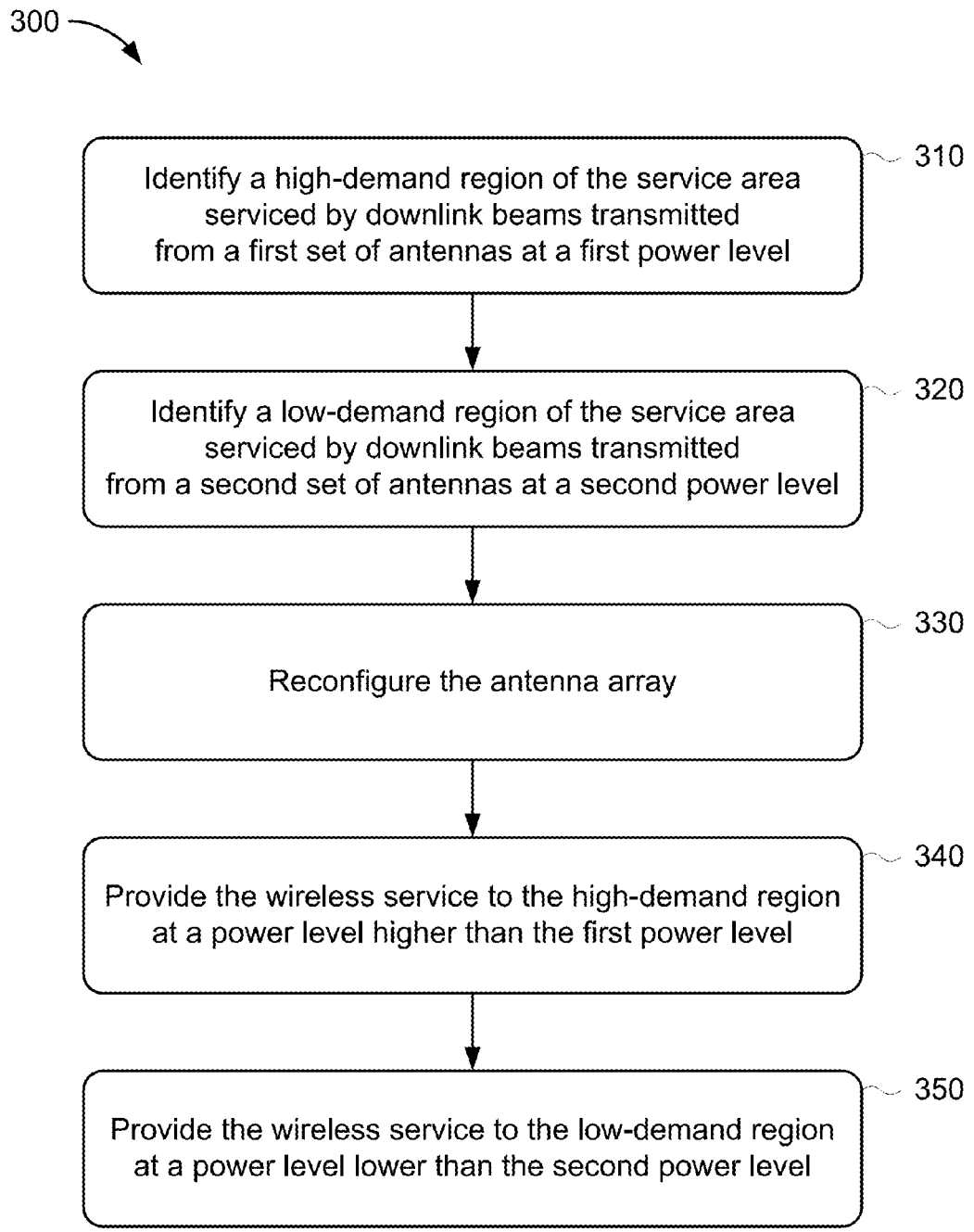
FIG. 3 is a flowchart for an example method of providing a wireless service to a service area using limited resources dynamically reallocated to maximize capacity in high demand regions.

FIG. 3 is a flowchart for an example method 300 of providing a wireless service to a service area using limited resources dynamically reallocated to maximize capacity in high demand regions. In broad overview of the method 300, an antenna manager 160 analyzes demand for various regions of a service area serviced from the base station 140 aboard the HAP 170. At stage 310, the antenna manager 160 identifies a high demand region of the service area serviced by downlink beams transmitted from a first set of antennas at a first power level, and at stage 320, the antenna manager 160 identifies a low demand region the service area serviced by downlink beams transmitted from a second set of antennas at a second power level. Stages 310 and 320 can happen in parallel, or either of stages 310 and 320 can happen first. At stage 330, the antenna manager 160 reconfigures the antenna array, e.g., reallocating power and other resources. As a result, at stage 340, the base station 140 provides the wireless service to the high demand region at a power level higher than the first power level and at stage 350 provides the wireless service to the low demand region at a power level lower than the second power level.

Referring to FIG. 3 in more detail, the antenna manager 160 analyzes demand for various regions of a service area serviced from the base station 140 aboard the HAP 170. Referring back to FIG. 2A, the base station 140 provides service to a region 232 of a service area (e.g., terrain 230) by transmitting a downlink beam 240 that creates a coverage circle 242 encompassing the region 232. Referring to FIG. 2A and FIG. 3, at stage 310, the antenna manager 160 identifies a high demand region 280 of the service area. The high demand region 280 is serviced by one or more downlink beams transmitted from a first set of antennas in the antenna array aboard the HAP 170. A downlink beam may be transmitted by a single antenna, or by multiple antennas in concert. The downlink antennas may also be responsible for uplink reception, or other antennas may be allocated for uplink reception. In some implementations, the antenna manager 160 identifies that antennas in the first set of antennas are servicing a high number of UEs 120. In some implementations, the antenna manager 160 determines that a region is a high demand region when demand in the region exceeds a threshold number of UEs 120. In some implementations, the antenna manager 160 determines that a region is a high demand region when demand in the region exceeds an average demand in the service area by a threshold margin.

In some implementations, a prediction system identifies that antennas in the first set of antennas service a high number of UEs 120 at consistent times or days and the antenna manager 160 identifies the high demand region based on a prediction. In some implementations the prediction is a utilization prediction based on one or both of: utilization history data and periodic population density. In some implementations, the antenna manager 160 maintains history data or population density data for use in generating a utilization prediction. The stored data may indicate, for example, which regions experience a surge or reduction in usage (or population) during specific time periods (e.g., by hour, block of hours, hour range, day, day of week, holiday/non-holiday, week, month, etc.). In some implementations, the population density data is divided into residential density data and commercial or industrial density data, such that the antenna manager 160 may treat the residential density data as periodic population density data for periods typically associated with non-work time (e.g., evenings, weekends, and holidays) and treat the commercial or industrial density data as periodic population density data for periods typically associated with work time (e.g., workdays between 7:00 AM and 7:00 PM, or other regionally appropriate hours). Accordingly, in some implementations, the antenna manager 160 may identify a region as a high demand region based on a determination that the current date and time are within a predicted date and time range during which the region is predicted to be a high demand region. For example, based on a prediction that a particular region has a high demand on workdays between 7:00 AM and 7:00 PM, the antenna manager 160 may identify that region as a high demand region when the date is a workday and the time is between 7:00 AM and 7:00 PM.

At stage 320, the antenna manager 160 identifies a low demand region of the service area serviced by downlink beams transmitted from a second set of antennas at a second power level. In some implementations, the antenna manager 160 identifies that antennas in the second set of antennas are servicing a low number of UEs 120. In some implementations, the antenna manager 160 determines that a region is a low demand region when demand in the region falls below a threshold number of UEs 120. In some implementations, the antenna manager 160 determines that a region is a low demand region when demand in the region is below average demand in the service area by a threshold margin. In some implementations, a prediction system identifies that antennas in the first set of antennas service a low number of UEs 120 at consistent times or days and the antenna manager 160 identifies the low demand region based on the prediction. In some implementations, the antenna manager 160 may identify a region as a low demand region based on a determination that the current date and time are within a predicted date and time range during which the region is predicted to be a low demand region. For example, based on a prediction that a particular region has a low demand on workdays between 7:00 AM and 7:00 PM, the antenna manager 160 may identify that region as a low demand region when the date is a workday and the time is between 7:00 AM and 7:00 PM.

In some implementations, stages 310 and 320 are combined. For example, in some implementations, the antenna manager 160 divides a service area into regions and ranks the regions by demand levels such that the region with the highest demand is identified as the high demand region and the region with the lowest demand is identified as the low demand region. In some such implementations, the regions are pre-determined, e.g., based on terrestrial or civil boundaries. In some such implementations, the regions are arbitrary, e.g., hexagons inscribed within a circle having some predetermined radius. In some implementations, when the regions ranked with the most (or least) demand are contiguous, the antenna manager 160, for purposes of allocating resources, merges the contiguous regions and treats them as a single region.

At stage 330, the antenna manager 160 reconfigures the antenna array, e.g., reallocating power and other resources. The antenna manager 160 reconfigures the antenna array to reallocate resources used to service low demand regions to instead service high demand regions. For example, in some implementations, the antenna manager 160 repurposes an antenna 142 and/or transceiver 144 from servicing a portion of a low demand region to instead service a portion of a high demand region. In some implementations, the antenna manager 160 adjusts antenna configurations so that the power requirements for serving the low demand region are lowered, reducing demand on the power supply 188. With demand reduced on the power supply 188, more energy is available to power antennas and transceivers servicing high demand regions.

In some implementations, the antenna manager 160 narrows a beam width for one or more of the downlink beams transmitted from the first set of antennas to at least part of the high demand region. A beam with a certain gain and width using a certain power level will require less power to maintain the same gain with a narrower aperture. In some implementations, the antenna manager 160 narrows the beam and reduces the energy allocation to the beam such that the gain remains approximately the same (e.g., within one decibel). In some implementations, the antenna manager 160 narrows the beam and leaves the energy allocation to the beam untouched, or even increased, such that the gain is increased on the narrower beam (as compared to before it was narrowed).

In some implementations, the antenna manager 160 increases a beam width for one or more of the downlink beams transmitted from the second set of antennas to at least part of the low demand region. A beam with a certain gain and width using a certain power level will require more power to maintain the same gain with a wider aperture. In some implementations, the antenna manager 160 widens the beam and increases the energy allocation to the beam such that the gain remains approximately the same (e.g., within one decibel). In some implementations, the antenna manager 160 widens the beam and leaves the energy allocation to the beam untouched, or even decreased, such that the gain is decreased on the wider beam (as compared to before it was widened).

In some implementations, the antenna manager 160 allocates multiple beams to service the high demand region. For example, in some implementations, if the narrow beam does not cover the entire high demand region, additional narrow beams are allocated to augment the coverage. In some instances, adjacent beams will overlap, effectively providing additional capacity within the high demand region. Further, the narrower beams may be operated at a lower power level, allowing for a lower aggregate power requirement to service the high demand region. The antenna manager 160 allocates an additional beam by adding an antenna to the set of resources used to service the high demand region. For example, the antenna manager 160 may redistribute antenna allocations such the set of antennas servicing the low demand region is reduced and the set of antennas servicing the high demand region is increased. In some implementations, one or more of the antennas in the antenna array aboard the HAP 170 have adjustable mountings, e.g., they are mounted to gimbals or articulated arms. In some implementations, the antenna array includes some antennas on fixed mounts and some antennas on adjustable mounts. In some implementations, a beam from an antenna can be aimed through beam forming. In some implementations, the beam forming is analog, whereby physical parameters of the antenna are adjusted to modify the aperture or focus of the resulting beam. In some implementations, the beam forming is digital. Beam forming techniques may also be used to adjust antenna sensitivity for receiving uplinks.

In some situations, a beam covering a high demand region may be able to improve capacity by increasing gain. Accordingly, in some implementations, the antenna manager 160 increases the energy allocation to the beam to increase the gain. Likewise, in some situations, a beam covering a low demand region may be able to reduce capacity by reducing gain, while still meeting the needs of the lower demand. Accordingly, in some implementations, the antenna manager 160 decreases the energy allocation to the beam to decrease the gain.

In some implementations, for a region with high demand, the antenna manager 160 increases the range of frequencies over which an antenna covering the region transmits. This increased bandwidth allows the beam to handle additional capacity to help satisfy the higher demand.

In some implementations, the aggregate power demands of the antenna array after reconfiguring in stage 330 is lower than the aggregate power demands prior to reconfiguring.

In some implementations, increasing the power allocation for servicing the high demand region would exceed the maximum power level supported by the power supply 188. The higher power level is offset by reducing the power allocation to low demand regions. In some implementations, the antenna manager 160 identifies a power reduction requirement caused by exceeding the maximum power level when increasing the power level used to service the high demand region (for example by increasing the bandwidth or number of beams serving the region) and reduces the power level used to service the low demand region by at least the power reduction requirement. In some implementations, the antenna manager 160 calculates the power levels needed in each region to balance the requirements. The antenna manager can reduce the power levels expended in serving one or more lower demand regions by, without limitation, decreasing the range of frequencies used in the transmissions in such regions, by assigning fewer, wider beams to cover the region, or by reducing the gain of the beams covering the region.

At stage 340, the base station 140 aboard the HAP 170 provides the wireless service to the high demand region at a power level different from, e.g., higher than, the first power level. In some implementations, providing the wireless service to the high demand region of the service area at the higher power level increases service capacity in the high demand region. The base station 140 provides the wireless service to the high demand region using the resources allocated by the antenna manager 160 at stage 330.

At stage 350 the mobile base station 140 aboard the HAP 170 provides the wireless service to the low demand region at a power level different from, e.g., lower than, the second power level. In some implementations, providing the wireless service to the low demand region of the service area at the lower power level decreases service capacity in the low demand region. The base station 140 provides the wireless service to the low demand region using the resources allocated by the antenna manager 160 at stage 330.

In some implementations, the antenna manager 160 allocates antennas for both downlink and uplink in each region. In some implementations, the antenna manager 160 allocates antennas for downlinks separately from antennas for uplinks.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer-executable instructions, in a non-transitory form.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose logic circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A system comprising:
   an antenna array configured to provide a wireless service to a service area by transmitting a plurality of downlink beams, each downlink beam covering a respective service region of the service area;
   a power supply configured to power the antenna array up to a maximum power level; and
   an antenna management logic configured to execute instructions that, when executed, cause the antenna management logic to:
      identify a high demand region of the service area serviced by one or more downlink beams transmitted from a first set of antennas at a first power level;
      identify a low demand region of the service area serviced by one or more downlink beams transmitted from a second set of antennas at a second power level;
      reconfigure the antenna array to:
         provide the wireless service to the high demand region of the service area at a third power level higher than the first power level; and
         provide the wireless service to the low demand region of the service area at a fourth power level lower than the second power level such that the antenna array has a total power requirement that does not exceed the maximum power level.

2. The system of claim 1, wherein:
   providing the wireless service to the high demand region of the service area at the third power level increases service capacity in the high demand region; and
   providing the wireless service to the low demand region of the service area at the fourth power level decreases service capacity in the low demand region.

3. The system of claim 1, wherein the antenna management logic is configured to provide the wireless service to the high demand region at the third power level by narrowing a beam width for one or more of the downlink beams transmitted from the first set of antennas to at least part of the high demand region.

4. The system of claim 3, wherein the antenna management logic is configured to provide the wireless service to the high demand region at the third power level by reconfiguring the antenna array to transmit an additional downlink beam to at least part of the high demand region.

5. The system of claim 1, wherein the antenna management logic is configured to identify the high demand region of the service area, and to identify the low demand region of the service area, according to a utilization prediction based on one or both of: utilization history data and periodic population density.

6. The system of claim 1, wherein the antenna management logic is configured to provide the wireless service to the high demand region at the third power level by changing a frequency range used by at least one of the downlink beams transmitted from the first set of antennas to at least part of the high demand region.

7. The system of claim 1, wherein the antenna management logic is configured to provide the wireless service to the low demand region at the fourth power level by widening a beam width for one or more of the downlink beams transmitted from the second set of antennas to at least part of the low demand region.

8. The system of claim 1, wherein the antenna management logic is configured to provide the wireless service to the low demand region at the fourth power level by reconfiguring the antenna array to:
   remove an antenna from the second set of antennas, leaving a remaining set of antennas to provide service to the low demand region; and
   reconfiguring the remaining set of antennas to transmit widened downlink beams to cover the low demand region.

9. The system of claim 1, wherein the antenna management logic is configured to provide the wireless service to the low demand region at the fourth power level by changing a frequency range used by at least one of the downlink beams transmitted from the second set of antennas to at least part of the low demand region.

10. The system of claim 1, further comprising a flight-capable platform, wherein the antenna array provides the wireless service by transmitting the downlink beams from the flight-capable platform while airborne.

11. The system of claim 1, wherein reconfiguring the antenna array comprises physically moving an antenna.

12. The system of claim 1, wherein reconfiguring the antenna array comprises redirecting a downlink beam through beam forming.

13. A method comprising:
   providing a wireless service to a service area by transmitting, via an antenna array, a plurality of downlink beams, each downlink beam covering a respective service region of the service area;

powering the antenna array from a power supply up to a maximum power level;

identifying, by an antenna management logic, a high demand region of the service area serviced by downlink beams transmitted from a first set of antennas at a first power level;

identifying, by the antenna management logic, a low demand region of the service area serviced by downlink beams transmitted from a second set of antennas at a second power level; and reconfiguring the antenna array to:
provide the wireless service to the high demand region of the service area at a third power level higher than the first power level; and
provide the wireless service to the low demand region of the service area at a fourth power level lower than the second power level such that the antenna array has a total power requirement that does not exceed the maximum power level.

14. The method of claim 13, comprising
increasing service capacity in the high demand region by providing the wireless service to the high demand region of the service area at the third power level; and
decreasing service capacity in the low demand region by providing the wireless service to the low demand region of the service area at the fourth power level.

15. The method of claim 13, comprising providing the wireless service to the high demand region at the third power level by narrowing a beam width for one or more of the downlink beams transmitted from the first set of antennas to at least part of the high demand region.

16. The method of claim 13, comprising providing the wireless service to the high demand region at the third power level by adding an antenna to transmit an additional downlink beam to at least part of the high demand region.

17. The method of claim 13, comprising identifying the high and low demand regions of the service area according to a utilization prediction based on one or both of: utilization history data and periodic population density.

18. The method of claim 13, comprising providing the wireless service to the low demand region at the fourth power level by reconfiguring the antenna array to:
remove an antenna from the second set of antennas, leaving a remaining set of antennas to provide service to the low demand region; and
reconfiguring the remaining set of antennas to transmit widened downlink beams to cover the low demand region.

19. The method of claim 13, comprising changing a frequency range used by at least one of the downlink beams transmitted from the antenna array.

20. The method of claim 13, comprising providing the wireless service by transmitting the downlink beams from a flight-capable platform while the flight-capable platform is airborne.

* * * * *